(12) United States Patent
Cassagnes

(10) Patent No.: US 7,319,722 B2
(45) Date of Patent: Jan. 15, 2008

(54) CIRCUIT FOR THE DECODING OF BIPHASE SIGNALS

(75) Inventor: Hervé Cassagnes, Aix en Provence (FR)

(73) Assignee: STMicroelectronics SA, Montrouge (FR)

(*) Notice: Subject to any disclaimer, the term of this patent is extended or adjusted under 35 U.S.C. 154(b) by 402 days.

(21) Appl. No.: 10/039,233

(22) Filed: Dec. 31, 2001

(65) Prior Publication Data
US 2003/0040891 A1 Feb. 27, 2003

(30) Foreign Application Priority Data
Aug. 24, 2001 (FR) .................................. 01 11074

(51) Int. Cl.
H04L 27/10 (2006.01)

(52) U.S. Cl. ...................... 375/282; 375/342; 375/340; 375/361; 375/333

(58) Field of Classification Search ................ 375/342, 375/316, 340, 361, 282, 333; 341/68, 70, 341/71
See application file for complete search history.

(56) References Cited

U.S. PATENT DOCUMENTS

| | | | |
|---|---|---|---|
| 5,056,114 A | 10/1991 | Wright | 375/87 |
| 5,684,479 A | 11/1997 | Hayashi | 341/102 |
| 5,778,031 A * | 7/1998 | Hiramatsu | 375/333 |
| 6,175,542 B1 * | 1/2001 | Okada et al. | 369/59.17 |

FOREIGN PATENT DOCUMENTS

GB 2171277 8/1986

* cited by examiner

*Primary Examiner*—Phuong Phu
(74) *Attorney, Agent, or Firm*—Lisa K. Jorgenson; Allen, Dyer, Dopplet, Milbrath & Gilchrist, P.A.

(57) ABSTRACT

A decoding circuit and associated method are provided for decoding a biphase signal. The decoding circuit may include a precharging register to precharge a pair of states of the biphase signal, where a state of the pair of states is precharged at each pulse of a periodic precharging signal. The decoding circuit may further include a verification circuit to compare the two states of the pair of states and give an active error signal if the two states are equal.

19 Claims, 3 Drawing Sheets

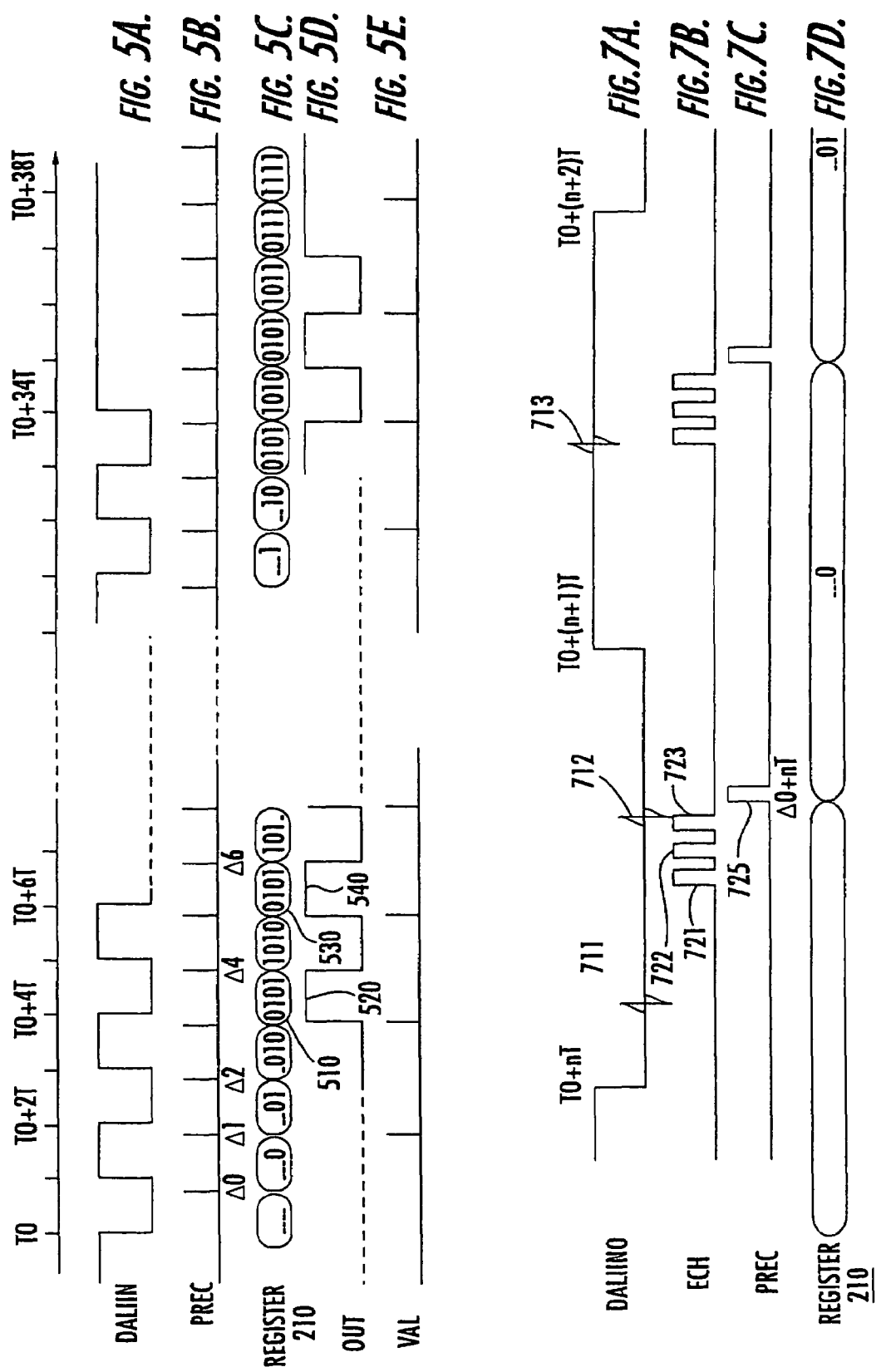

CIRCUIT FOR THE DECODING OF BIPHASE SIGNALS

FIELD OF THE INVENTION

The invention relates to the field of electronic circuits, and, more particularly, to a circuit for decoding biphase signals, which may be used in a circuit for the transmission or reception of such signals. The invention is especially useful for the reception of signals according to the digital addressable lighting interface (DALI) communications protocol, which may be used to control electronic ballasts. However, the invention may more generally be used for the reception of numerous types of biphase signals.

BACKGROUND OF THE INVENTION

Ballasts are electronic circuits used to drive fluorescent bulbs, mercury bulbs, and arc lamps in general. Ballasts can be controlled by digital signals, for example, according to the DALI communications protocol set forth in the IEC standard of Jan. 10, 2000. According to the DALI communications protocol, a received digital signal takes the form of a frame including a start bit, a 16-bit binary word, and two end bits, giving a 19-bit frame. The 16-bit word includes, for example, an 8-bit address and an 8-bit instruction. In return, a transmitted digital signal takes the form of an 11-bit frame including a start bit, 8 bits of data, and two end bits.

The DALI communications protocol also specifies that each bit of a frame received or sent by the control circuit is encoded in the form of a biphase signal, namely in the form of a signal taking two successive states. A logic 1 is encoded as a signal (FIG. 1, ref. 110a, 110b) which is equal to 0 during a first phase and 1 during a second phase. Similarly, a logic 0 is encoded as a signal (FIG. 1, ref. 120a, 120b) equal to 1 during the first phase and 0 during the second phase. A start bit (130a, 130b) is encoded as a signal equal to 0 during a first phase and 1 during a second phase. Finally, an end bit (140a, 140b) is encoded as a signal equal to 1 during both phases.

Thus, all the bits of a frame are encoded as follows: a logic 1 is encoded by the pair of states 01; a logic 0 is encoded by the pair 10; a start bit is encoded by the pair 01; and an end bit is encoded by the pair 11. A 19-bit frame (reception) or 11-bit frame (transmission) is thus encoded as a binary number having 38 or 22 states, respectively. The frames thus encoded are transmitted at a speed of 1200 bits per second, namely 2400 states per second since each bit is encoded in two states. The transmission time for one state of a frame is thus equal to $T=1/2400$, so $T=416.37$ µs.

SUMMARY OF THE INVENTION

It is an object of the invention to provide a circuit for decoding biphase signals by receiving such signals and extracting the relevant information therefrom.

Another object of the invention is to make a circuit for decoding biphase signals that is capable of verifying the accurate reception of such signals.

In accordance with these objects, a decoding circuit according to the invention for decoding a biphase signal may include a precharging register to precharge a pair of states of the biphase signal to be decoded. One of the pair of states may be precharged at each pulse of a periodic precharging signal, for example. Further, the decoding circuit may also include a verification circuit for comparing the two states of the pair of states and providing an active error signal if the two states are equal.

The decoding circuit of the invention thus provides for the reception of the pairs of states of the biphase signals and verification thereof. That is, the circuit of the invention, after reception of each pair of states, indicates whether the states have been accurately received or not. If the two states of the same pair are identical, this indicates that at least one of the states is erroneous. This observation is deduced from the manner of encoding a biphase signal as described above. When the biphase signal is received, the verification circuit may make a pair-by-pair check on all the pairs of states contained in the frame of a biphase signal.

More particularly, the verification circuit may also provide a decoded signal representing a pair of states stored in the precharging register. Thus, after verification, the verification circuit provides not all the states of the biphase signal but only the relevant information contained in the biphase signal.

The decoding circuit according to the invention may also advantageously include a storage circuit for storing the decoded signal at each pulse of a periodic validation signal, which may have a period equal to twice the period of the precharging signal. The storage circuit may be a register or a memory circuit, for example.

At each pulse of the validation signal, the storage circuit may thus perform a bit-by-bit storage of all the bits of the word contained in the frame of the biphase signal, as will be described further below. It should be noted that the decoding circuit according to the invention may restrict the size of the storage circuit to the size of the word contained in the frame of the biphase signal (e.g., 16 bits or twice 8 bits).

The decoding circuit may also advantageously include a delay circuit for producing an end signal after a predefined time to indicate the end of the biphase signal. The delay circuit may be initialized at the beginning of the biphase signal, for example, during the reception of the start bit of a frame. The end signal may be used to cancel any active error signal during the reception of an end bit (encoded by a pair of identical states 11), for example.

The precharging register may be a shift register including a serial input to which the biphase signal to be decoded is applied, and a parallel input connected to a parallel data input of the verification circuit. The precharging register may include at least two bits for storing at least one pair of states to be checked by the verification circuit. The precharging register may also store a relatively large number of bits, e.g., 4 bits.

In addition, the verification circuit may include a first gate having two inputs connected to two successive lines of the parallel data output of the precharging register. The first gate may verify whether the states of a given pair of states in the precharging register are different (i.e., a correct reception) or identical (i.e., a poor reception).

If the precharging register has at least 4 bits, the verification circuit may advantageously include a second gate having two inputs connected to two other successive lines of the parallel data output of the precharging register, and a third gate having two inputs respectively connected to the output of the first gate and to the output of the second gate. This arrangement may be used to detect and store the two end bits indicating the end of a frame of the signal to be decoded.

Furthermore, if the decoding circuit includes a delay circuit, the verification circuit may advantageously include another gate having one input connected to an output of the third gate, another input to which the end signal is applied, and an output at which the error signal is produced. Accordingly, when the end signal is active, the error signal is inactive, thus indicating that the last two states received have been received correctly, whatever the value of these states. It is thus possible not to report an error when the end bits, encoded by two identical states and equal to 1, are received in the precharge register.

The decoding circuit may further include a filter for filtering the biphase signal to be decoded. The filter may have an input to which the biphase signal is applied and an output connected to a serial input of the precharging register. The filter may overcome any short-lived disturbances that might appear on the signal to be decoded.

More particularly, the filter may include a sample register to store samples of a state of the pair of states of the biphase signal to be decoded, and a set of logic gates to compute a mean value of the samples in the sample register and provide the mean value to the precharging register.

A further object of the invention is also to provide a method for decoding a biphase signal which may be implemented, for example, but not solely, by a decoding circuit as described briefly above. The method may include a step for the precharging of a pair of states of the biphase signal, where one state of the pair of states is precharged at each pulse of a periodic precharging signal (PREC), and a step of comparing the two states of the precharged pair of states. The method may further include a step of supplying an error signal (ER) that is active if the two states are equal or inactive if they are not.

The method may also include a step of supplying a decoded signal representing the precharged pair of states. Advantageously, a further step may be included for storing the decoded signal at each pulse of a periodic validation signal, which may have a period equal to twice the period of the precharging signal. A time measurement step, initialized at the start of the biphase signal, may also be included for producing an end signal after a predetermined time, which indicates the end of the biphase signal. Additionally, the method may also include a step of filtering the biphase signal before the precharging step.

A circuit for transmitting and receiving biphase signals encoded according to the DALI communications protocol is also provided according to the invention, and the circuit may include a decoding circuit as briefly described above. In addition, a circuit for controlling an electronic ballast receiving driving signals in the form of biphase signals encoded according to the DALI communications protocol is also provided which similarly includes a decoding circuit as briefly described above.

BRIEF DESCRIPTION OF THE DRAWINGS

The invention and the advantages that follow therefrom will be seen more clearly from the following description of exemplary embodiments of a circuit for decoding biphase signals according to the invention with reference to the appended drawings, in which:

FIGS. 5A to 5E are timing diagrams of signals at different points in the circuit of FIG. 2;

FIGS. 7A to 7D are timing diagrams of signals at different points in the circuit of FIG. 6.

DETAILED DESCRIPTION OF THE PREFERRED EMBODIMENTS

Figure 1:
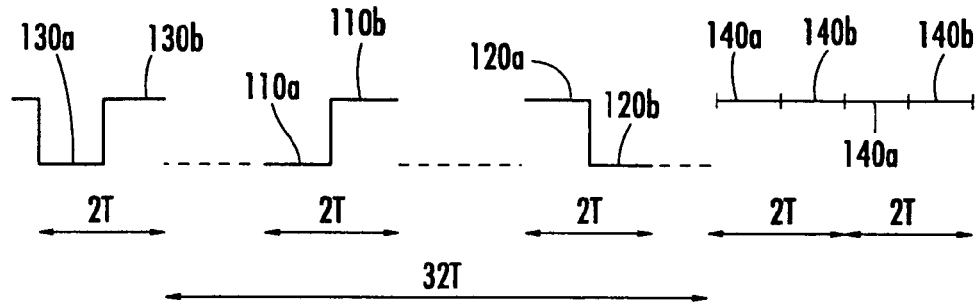
FIG. 1, described above, illustrates graphs of various prior art biphase signals.
Figure 2:
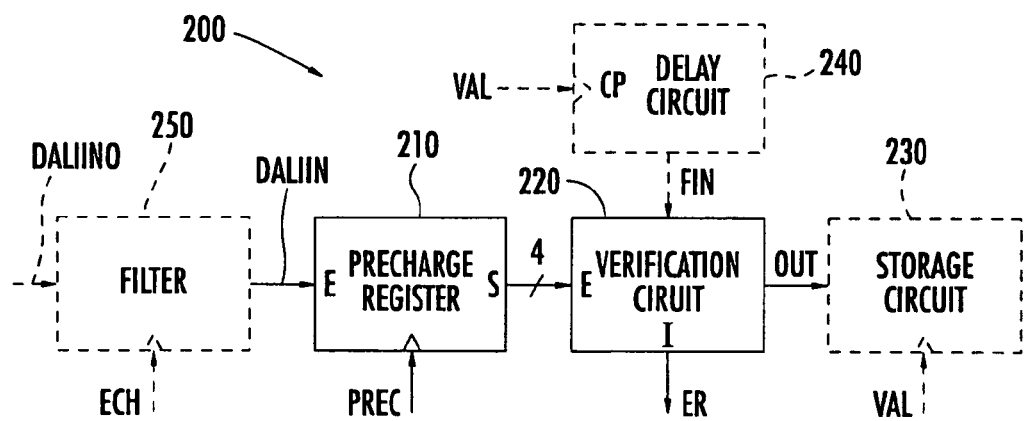
FIG. 2 is a schematic block diagram of a decoding circuit according to the invention.

The decoding circuit 200 illustrated in FIG. 2 includes a precharging register 210 and a verification circuit 220. The register 210 has a serial data input E, a clock input CP, and a parallel data output S. A signal DALIIN is applied to the input E of the register 210. The signal DALIIN is a biphase signal containing digital data in the form of 19-bit frames encoded by 38-state binary numbers. A precharging signal PREC, which is periodic, is applied to the input CP. The signal PREC has a period equal to T=416.67 µs, namely the duration of transmission of a state of a frame.

Figure 3:
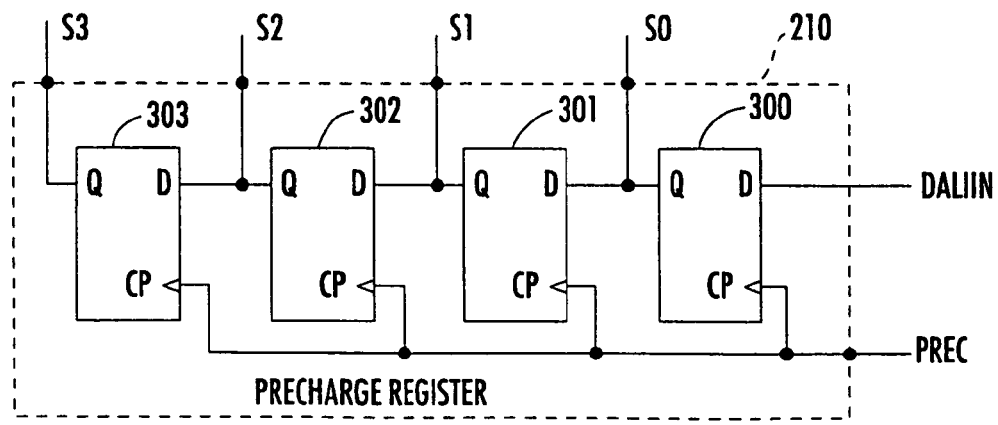
FIG. 3 is a more detailed schematic diagram of the precharge register of FIG. 2.

The register 210 is a 4-bit shift register, which is further illustrated in FIG. 3. The register 210 has four D type latches 300 to 303 that are series-connected, each including a data D input, a clock input CP, and a data Q output. The D input of the latch 300 is connected to the input E of the register 210. The D inputs of the latches 301 to 303 are connected respectively to the Q outputs of the latches 300 to 302. The inputs CP of all the latches 300 to 303 are connected together to the input CP of the register 210 to receive the control signal PREC. Finally, the Q outputs of the latches 300 to 303 are connected to serial outputs SO to S3 for providing the parallel output S of the register 210.

Operation of the register 210 is as follows. At each active edge of the signal PREC, a state of the signal DALIIN is entered as a least significant bit into the register 210, and the four bits contained in the register 210 are given at its output S.

The verification circuit 220 includes a parallel data input E connected to the output S of the register 210, a serial data output OUT, and an information output I. As noted above, according to the DALI protocol a logic 1 is encoded by the pair of states 01, and a logic 0 is encoded by the pair 10. The data are transmitted to the circuit 200 in the form of 19-bit frames containing a start bit (equal to 1 and encoded 01), a 16-bit word, and two end bits. All the bits of the 16-bit word are encoded by the pair 01 and the pair 10.

The circuit 220 is used to check whether the states (more specifically, the pair of states) of the encoded frame are accurately received or not. For this purpose, the circuit 220 compares two states previously received and stored in the register 210. If the two states are different, then the circuit 220 gives an inactive signal ER (in a first logic state, for example, 1) at its output I. If, on the contrary, the two states are identical, then the circuit 220 gives an active signal ER (in a second logic state, for example, 0). At the same time, the circuit 220, at its data output OUT, gives a data bit representing two compared states. In the example described, the data bit given at the output OUT is the bit stored in the latch 302 of the register 210.

After the reception of a pair of states, if there is an inactive signal ER then the two states are different, and therefore the corresponding bit of the frame has been accurately received. On the contrary, if there is a signal ER that is active after the reception of a pair of states, the two states of the pair of states received are identical and the corresponding bit of the frame has therefore not been accurately received. Thus, the value of the signal ER is preferably taken into account after the reception of a pair of states and not after the reception of a first state of a pair of states. The signal ER may also be used, for example, to stop operation of the circuit 200 and/or reinitialize it.

Figure 4:
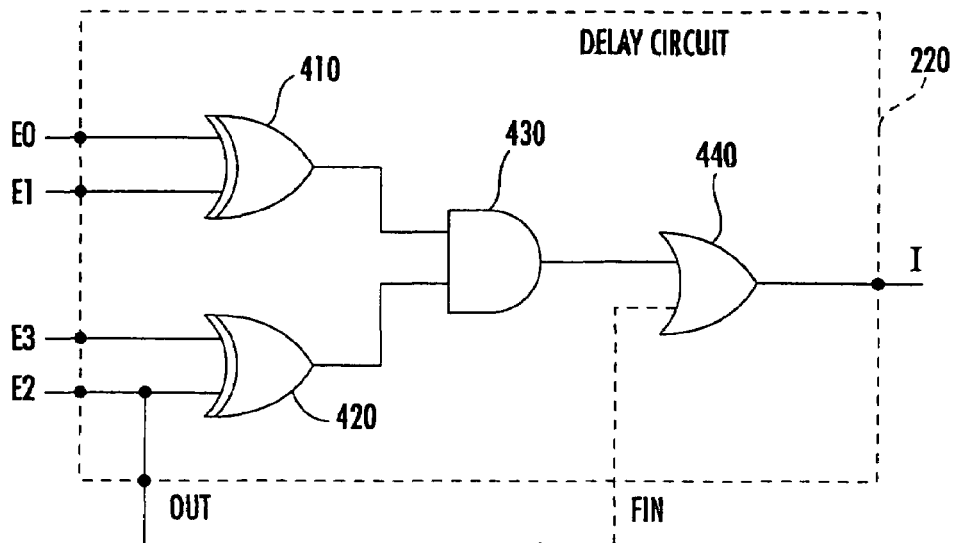
FIG. 4 is a more detailed schematic diagram of the verification circuit of FIG. 2.

An exemplary embodiment of the circuit 220 is illustrated in greater in detail in FIG. 4. It has two XOR type logic gates 410, 420 and an AND type logic gate 430, each gate having two inputs and one data output. The two inputs of the gate 410 are connected to inputs E0, E1 of the circuit 220, and the two inputs of the gate 420 are connected to inputs E2, E3 of the circuit 220, the inputs E0 to E3 forming the parallel input E of the circuit 220. The respective outputs of the gates 410, 420 are connected to the inputs of the gate 430. Finally, the input E2 is connected to the output OUT of the circuit 220, and the output of the gate 430 is connected to the output I of the circuit 220.

The general operation of the decoding circuit 200 according to the invention will now be described in detail in the context of a digital example with reference to the timing diagrams of FIGS. 5A to 5E. In the illustrated example, the frame received (FIG. 5A) includes a start bit (encoded by the pair 01), a 16-bit word including logic 1 values (encoded 01) as most significant bits and logic 0 values (encoded 10) as least significant bits, and two end bits (encoded 11). FIG. 5B shows the form of the signal PREC. Also, FIGS. 5C, 5D show the contents of the register 210 and the development of the signal OUT at output of the circuit 220. It will be assumed for the example that initially all the latches of the circuit 200 are initialized at 1.

At the instant T0, the circuit 200 is activated and the reception of the signal DALIIN begins. Between T0 and T0+2T, the start bit is received. That is, the signal DALIIN is equal to 0 during the time T, and then it is equal to 1 between T0+T and T0+2T. At the instant $\Delta^0$, between T0 and T0+T, the signal PREC is active and the signal DALIIN equal to 0 is stored in the first latch 300 of the register 210.

At the instant $\Delta 1 = \Delta 0 + T$, the signal PREC is again active and the signal DALIIN, now equal to 1, is stored in the first latch 300, the 0 previously stored being shifted in the latch 301. The first pair of states is thus stored in the register 210. Furthermore, the input E1 of the circuit 220 is at 0, and the input E0 is at 1. The circuit 220 provides an inactive signal ER at its output indicating an accurate reception of the first pair of states 01, pertaining to the frame start bit. Further, in parallel, the circuit 220 produces a logic 1 at its output OUT.

At the instant $\Delta 2 = \Delta 0 + 2T$, the signal PREC is again active and the signal DALIIN is now equal to 0 and is stored in the first latch 300, the previous contents of the latch 300 and of the latch 301 respectively being shifted to the latch 301 and the latch 302. The signal OUT is equal to 0.

At the instant $\Delta 3 = \Delta 0 + 3T$, the signal PREC is again active and the signal DALIIN, now equal to 1, is stored in the first latch 300, the 0 previously stored being shifted in the latch 301. The second pair of states is stored in the register 210 which thus contains the number 0101 (ref. 510, FIG. 5C). Furthermore, the input E1 of the circuit 220 is at 0 and its input E0 is at 1. The circuit 220 gives an inactive signal ER at its output, indicating accurate reception of the number 01 pertaining to a bit equal to 1. In parallel, the signal OUT goes to 1 (ref. 520, FIG. 5C).

At the instant $\Delta 4 = \Delta 0 + 4T$, the signal PREC is again active and the signal DALIIN is again equal to 0 and is stored in the first latch 300, the previous contents of the latches 300 to 302 being respectively shifted to the latches 301 to 303. The signal OUT is equal to 1.

At the instant $\Delta 5 = \Delta 0 + 5T$, the signal PREC is again active and the signal DALIIN, now equal to 1, is stored in the first latch 300, the 0 previously stored being shifted in the latch 301. The third pair of states is stored and the register 210 thus contains the number 0101 (ref. 530, FIG. 5C). Furthermore, the inputs E1, E0 of the circuit 220 are respectively at 0 and at 1. The circuit 220 provides an inactive signal ER at its output indicating an accurate reception of the number 01 pertaining to a bit equal to 1. At the same time, the signal OUT goes to 1 (ref. 540, FIG. 5C).

At the instant $\Delta^6$, the active signal PREC gives rise to the precharging of a new bit into the register 210 (a 0 bit in the example). At the instant $\Delta^7$, the active signal PREC also gives rise to the precharging of a new bit into the register 210 (1 in the example). The circuit 220 gives an inactive signal ER indicating good reception, and the contents of the latch 302 (in this case a 1) are produced at the output OUT. The second bit (i.e., a 1) of the 16-bit word contained in the frame received is thus transmitted. The entire procedure is repeated until all the bits of the frame have been received.

According to one alternate embodiment, a storage circuit 230 (shown in dashes in FIG. 2) may be included in the circuit 200 to store the bits of the 16-bit word containing the frames received when the bits are given by the circuit 220. For example, the storage circuit 230 (FIG. 2) may include a serial data input E connected to the data output OUT of the circuit 220, and a clock input CP to which a validation signal VAL is applied.

The validation signal VAL is a periodic signal with a period equal to twice the period of the signal PREC, namely 2T=833.33 µs herein. An exemplary signal VAL is shown in FIG. 5E. In this example, a leading edge of the signal VAL is produced upon reception of the second state of each pair of states. It will be recalled that the second state of a pair of states corresponds to a value of the encoded bit. For example, the pair 10 whose second state is equal to 0 encodes the bit 0.

In the example, the circuit 230 is obtained by a 16-bit shift register whose rate is set by the signal VAL. A register of this kind is similar to the register 210. Thus, at each leading edge of the signal VAL, the circuit 230 stores a bit of the 16-bit word contained in the received frame. Depending on the particular application, the 16-bit word stored in the register 230 may be subsequently stored in two 8-bit registers or else in a memory, or it could be used by any other circuit.

It should be noted that the circuit 230 is not indispensable to the working of the circuit 200, especially if the words produced by the circuit 220 are used directly by another element. In practice, the circuit 230 could be an input register of an element (computation circuit, control circuit, etc.) furthermore using the 16-bit word received.

It should also be noted that, if storage of the received bits is necessary, then the decoding circuit 200 according to the invention may limit the size of the storage circuit 230 to 16 bits (or twice 8 bits). A standard reception circuit typically requires the use of a 32-bit register capable of storing all the states of the biphase signal received.

Another alternate of the circuit of FIG. 2 includes a delay circuit 240 (shown with dashes in FIG. 2) including a clock input to which the signal VAL is applied, and an output connected to an output FIN of the circuit 220. The circuit 240 is activated when the circuit 220 decodes the start bit of the frame (this corresponds to the first activation of the signal ER). The circuit 240 produces an end signal at the end of a predefined time equal to 32T. The circuit 240 thus measures the time needed for the reception of a 16-bit word contained in a frame (the 16-bit word being encoded by 16 pairs of states, namely a reception time of 32T), and then informs the circuit 220 by the signal FIN (which in the example is active and is at 1) that all the bits of the frame have been received.

Various delay circuits known in the art may be used for the delay circuit 240. For example, the circuit 240 may be a 4-bit counter receiving pulses of the signal VAL having a period 2T and producing the signal FIN when it reaches a predefined value. More generally, the circuit 240 may be provided by any delay circuit capable of sending a signal FIN at the end of a predetermined time equal to 32T.

If a delay circuit 240 is added, the circuit 220 should be modified accordingly to take the signal FIN into account. In the example of FIG. 4, an OR gate 440 (shown in dashes) is added to the circuit 220 which has two inputs respectively connected to an input FIN of the circuit 220 and the output of the gate 410. The gate 440 also has an output connected to the output I of the circuit 220. Thus, if the signal FIN is active, the gate 440 gives a logic 1 whatever the value applied according to the inputs E0 to E3 of the circuit 220.

Further improvements may be realized by including a filter 250 (shown in dashes in FIG. 2) in the decoding circuit 200. The filter 250 may include an input to which the encoded signal DALIIN0 is applied, a clock input CP to which a sampling signal ECH with a period T is applied, and a data output S connected to the data input of the precharging register 210. The filter 250 computes a mean value of the signal DALIIN0 during a period T (between $\Delta^{0+n*T}$ and $\Delta^{0+(n+1)*T}$, for example, where n is an integer) and provides this mean value to the register 210. A filter of this kind thus reduces the effects of the parasitic disturbances that may be present in the signal DALIIN0.

Figure 6:
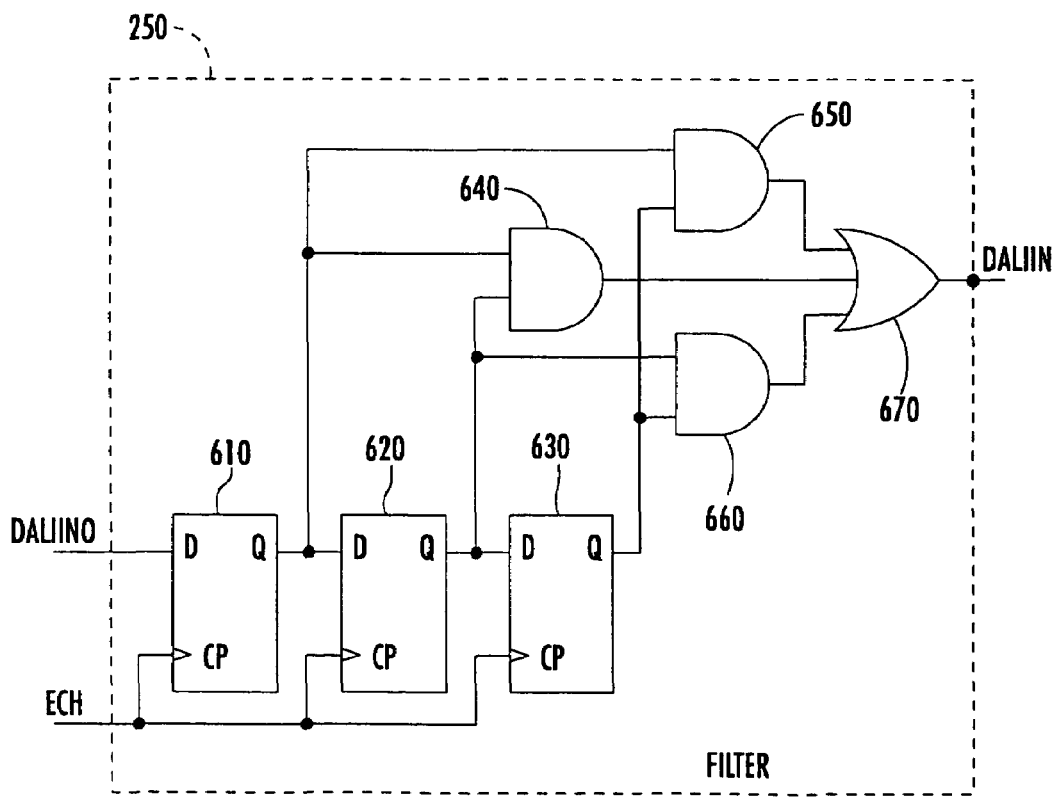
FIG. 6 is a more detailed schematic diagram of the filter of FIG. 2.

An exemplary filter that may be used in the invention is shown in FIG. 6. It has three D latches 610, 620, 630, three AND gates 640, 650, 660 with two inputs and one output, and one OR gate with three inputs and one output. The latches 610, 620, 630 are series-connected. More particularly, the D input of the latch 610 is connected to the input E of the filter 250 to receive the signal DALIIN0, and the D inputs of the latches 620, 630 are connected to the Q outputs of the latches 610, 620. The clock inputs CP of all the latches 610, 620, 630 are connected together to the input CP of the filter 250 to receive the signal ECH.

An input of the gate 640 is connected to the Q output of the latch 610, and the other input of the gate 640 is connected to the Q output of the latch 620. An input of the gate 650 is connected to the Q output of the latch 610, and the other input of the gate 650 is connected to the Q output of the latch 630. An input of the gate 660 is connected to the Q output of the latch 620, and the other input of the gate 660 is connected to the Q output of the latch 630. Further, the inputs of the gate 670 are connected respectively to the output of the gate 640, the output of the gate 650, and the output of the gate 660. The output of the gate 670 is connected to the output S of the filter 250.

Operation of the filter 250 will now be explained by way of example. FIG. 7A shows the signal DALIIN0 between T0+n*T and T0+(n+2)*T, n being an integer. In the example, the signal DALIIN0 is equal to 0 between T0+n*T and T0+(n+1)*T, then it is equal to 1 between T0+(n+1)*T and T0+(n+2)*T. Small disturbances 711, 712, 713 modify the value of DALIIN0 from time to time.

The signal ECH (FIG. 7B) is periodic with a period T. In the example, it has three pulses 721, 722, 723 per period. The signal PREC (FIG. 7C) used by the register 210 also has a period T. It has only one pulse 725 per period which appears after the pulse 723. The signals ECH, PREC as well as the signal VAL are provided, for example, by a control circuit not described here. These signals are produced, for example, from a total clock signal of a component using the circuit of the invention. This clock signal has a frequency that is a multiple of the frequency of the signals ECH, PREC, VAL, for example, a frequency equal to 16/T.

During the three pulses 721, 722, 723 on the signal ECH, three values of the signal DALIIN0 are stored in the latches 610, 620, 630. The gates 640, 650, 660, 670 at all times compute a mean value of the values contained in the latches 610, 620, 630, and the mean value is given at the output S of the filter 250. At the next pulse PREC 725, the mean value given by the filter 250 is stored in the register 210.

In the example, at the pulses 721, 722 in the signal ECH, the signal DALIIN0 is equal to 0 and two 0's are stored in the latches of the filter 250. Then, at the pulse 723, a 1 is stored in the latches due to the presence of the disturbance 712. The latches 640, 650, 660, 670 compute a mean value from the contents of the latches 610, 620, 630, and a logic 0 is thus provided at the output of the filter 250 and is stored in the register 210 during the pulse 725 in the signal PREC. The effects of the disturbance 712 have thus been erased.

Further modifications may also be made in the decoding circuit 200 of FIG. 2 in alternate embodiments. For example, the output of the register 210 may be modified. Indeed, in the above example, the output S2 of the register 210 is connected to the input of the register 230 to store a bit of the signal DALIIN in the register 230 at each pulse VAL. It will also be possible to connect one of the other outputs (S0, S1 or S3) of the register 210 to the input of the register 230. If necessary, the signal VAL may be modified accordingly so that the relevant states in the signal DALIIN corresponding to the bits of the 16-bit word encoded in the signal DALIIN are provided by the circuit 220 at the appropriate time.

The size of the register 210 can also be modified. Indeed, the register 210 used in the examples described above is a 4-bit register. The essential role thereof is to store the states of the received signal DALIIN two-by-two so that these pairs of states are tested by the circuit 220. The advantage of using a 4-bit register 210 is that it is possible to fully store the four states encoding the end bits. It will, however, be possible to choose a register 210 including only 2 bits or, to the contrary, a register with a size of over four. If necessary, the circuit 220 may be modified accordingly. For example, if a 2-bit register 210 is chosen, the gates 420, 430 of the circuit 220 become unnecessary and may be eliminated. In this case, the output of the gate 410 is directly connected to the output I of the circuit 220.

The control signals PREC, VAL, ECH (given by a control circuit, not shown) can also be modified. However, all three control signals should be periodic, the signals PREC, ECH having a period T and the signal VAL having a period 2T These signals may be obtained from a clock signal external to the circuit and a set of logic gates and/or delay circuits. In the above examples, these signals are all pulse signals. However, it is possible to replace all or part of these signals by square-wave signals, for example, the leading edges (or trailing edges) of which in this case are taken into account for the control of the circuits.

That which is claimed is:

1. A decoding circuit for decoding a biphase signal having a pair of states and comprising:
   a precharging register for precharging respective states of the biphase signal, one state of the pair of states being precharged at each pulse of a periodic precharging signal; and
   a verification circuit cooperating with said precharging register for comparing the two states of the pair of states to detect an error and providing an error signal when the two states are equal indicating that they have not been received accurately.

2. The decoding circuit of claim 1 further comprising a storage circuit for storing the decoded signal at each pulse of a periodic validation signal, the periodic validation signal having a period equal to twice the period of the periodic precharging signal.

3. The decoding circuit of claim 1 further comprising a delay circuit connected to said verification circuit and providing an end signal indicating an end of the biphase signal after a predetermined delay, said delay circuit being initialized at the beginning of the biphase signal.

4. The decoding circuit of claim 1 further comprising a filter upstream from said precharging register for filtering the biphase signal.

5. A decoding circuit for decoding a biphase signal having a pair of states representing a value, the decoding circuit comprising:
   a precharging register for precharging respective states of the biphase signal, one state of the pair of states being precharged at each pulse of a periodic precharging signal; and
   a verification circuit cooperating with said precharging register for comparing the two states of the pair of states and providing an error signal when the two states are equal indicating that they have not been received accurately, said verification circuit also providing a decoded signal indicating the value of the precharged pair of states.

6. The decoding circuit of claim 5 further comprising a storage circuit for storing the decoded signal at each pulse of a periodic validation signal, the periodic validation signal having a period equal to twice the period of the periodic precharging signal.

7. The decoding circuit of claim 5 further comprising a delay circuit connected to said verification circuit and providing an end signal indicating an end of the biphase signal after a predetermined delay, said delay circuit being initialized at the beginning of the biphase signal.

8. The decoding circuit of claim 5 further comprising a filter upstream from said precharging register for filtering the biphase signal.

9. A circuit for transmitting and receiving biphase signals having respective pairs of states and comprising:
   transmission and reception circuitry for sending and receiving the biphase signals; and
   a decoding circuit coupled to said reception circuitry for decoding the biphase signals and comprising
      a precharging register for precharging respective states of the biphase signals, one state of each pair of states being precharged at each pulse of a periodic precharging signal; and
      a verification circuit for comparing the two states of each pair of states to detect an error and providing an error signal when the two states are equal indicating that they have not been received accurately.

10. The circuit of claim 9 wherein the biphase signals are encoded according to the digital addressable lighting interface (DALI) communications protocol.

11. The circuit of claim 9 wherein the pair of states represent a value, and wherein said verification circuit also provides a decoded signal indicating the value of each precharged pair of states.

12. The circuit of claim 11 wherein said decoding circuit further comprises a storage circuit for storing the decoded signal at each pulse of a periodic validation signal, the periodic validation signal having a period equal to twice the period of the periodic precharging signal.

13. The circuit of claim 9 wherein said decoding circuit further comprises a delay circuit connected to said verification circuit and providing an end signal indicating an end of each biphase signal after a predetermined delay, said delay circuit being initialized at the beginning of each biphase signal.

14. The circuit of claim 9 wherein said decoding circuit further comprises a filter upstream from said precharging register for filtering the biphase signals.

15. A method for decoding a biphase signal having a pair of states, the method comprising:
   precharging one of the pair of states of the biphase signal into a precharging register at each pulse of a periodic precharging signal;
   comparing the two states of the precharged pair of states to detect an error when the two states are equal indicating that they have not been received accurately; and
   providing an error signal based upon detecting the error.

16. The method of claim 15 further comprising supplying a decoded signal indicating a value of the precharged pair of states.

17. The method of claim 16 further comprising storing the decoded signal at each pulse of a periodic validation signal, the periodic validation signal having a period equal to twice the period of the periodic precharging signal.

18. The method of claim 15 further comprising measuring a predetermined time from a start of the biphase signal, and providing an end signal after the predetermined time indicating an end of the biphase signal.

19. The method of claim 15 further comprising filtering the biphase signal prior to precharging each of the pair of states.

* * * * *